June 3, 1969  W. HERTL  3,447,952
MANUFACTURE OF SILICON CARBIDE FIBERS
Filed Dec. 7, 1965
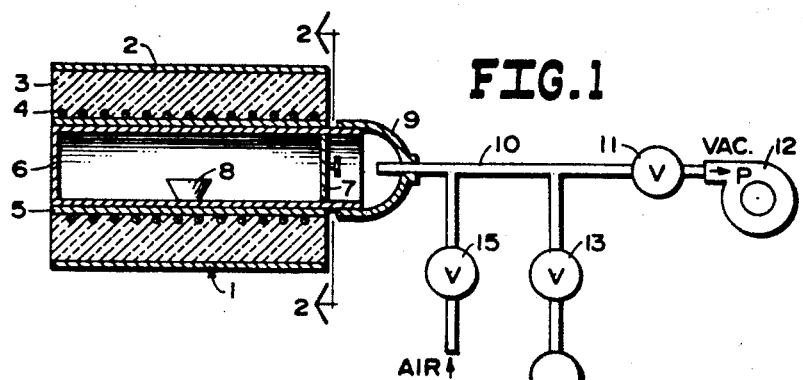
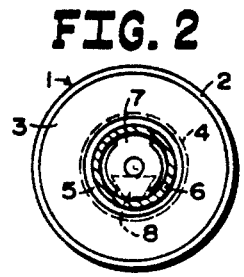
INVENTOR.
William Hertl
BY
ATTORNEY

000
3,447,952
MANUFACTURE OF SILICON CARBIDE FIBERS

William Hertl, Corning, N.Y., assignor to Corning Glass Works, Corning, N.Y., a corporation of New York
Filed Dec. 7, 1965, Ser. No. 512,104
Int. Cl. C23c 13/02; C01b 31/36
U.S. Cl. 117—106      4 Claims

ABSTRACT OF THE DISCLOSURE

This invention relates to the production of submicroscopic fibers containing silicon carbide crystals through the reaction of finely-divided silicon carbide and a solid oxidant having a free energy of dissociation of the oxygen atom less than +100 Kcal/mole at a temperature between 1350°–1650° C. in a vacuum or an inert gaseous atmosphere.

---

In my application, Ser. No. 512,043 filed concurrently herewith, there is described a method for producing fibers of submicroscopic size containing crystals of silicon carbide through the controlled oxidation of finely-divided silicon carbide by means of the gaseous oxidants carbon dioxide, oxygen, and water vapor. That application is founded upon the generalized reaction:

$$SiC + 2[O] \rightarrow SiO + CO$$

Hence, when the finely-divided silicon carbide powder is heated to a high temperature in the presence of $CO_2$, $O_2$, or $H_2O$, it is oxidized to gaseous SiO and CO which combine together at a somewhat lower temperature to form the SiC fibers. I have now discovered that submicroscopic fibers containing crystals of silicon carbide can be produced through the controlled oxidation of finely-divided silicon carbide by means of solid oxidizing agents.

FIGURE 1 is a diagrammatic representation of an apparatus suitable for producing fibers in accordance with the instant invention.

FIGURE 2 is a vertical cross sectional view taken along lines 2—2 of FIGURE 1.

In its most fundamental terms, this invention contemplates exposing a charge composed of measured amounts of silicon carbide and at least one solid oxidant, whose characterizing properties will be defined hereinafter, to a temperature range wherein reaction will occur between the silicon carbide and the solid oxidant and maintaining this temperature for a period of time of sufficient length to cause the growth of the desired fibers. The apparatus utilized for this production must provide for an area operating at a lower temperature than the temperature at which the reaction producing SiO and CO takes place, since it is believed that the same generalized reaction obtaining in the above-described Ser. No. 512,043 occurs here also and there is a transport of gaseous SiO and CO from the heated charge, the combination thereof to condense to a fibrous deposit taking place at a temperature somewhat below the intial reaction temperature. The reaction may be carried out in a substantial vacuum, i.e., at a pressure less than about 5 mm. of mercury and, preferably, less than 1 mm. of mercury, or in an environment composed of an inert gas such as helium, neon, argon, or krypton.

Examination of these fibers by electron microscopy and X-ray diffraction techniques has demonstrated a structure consisting of a core portion of silicon carbide crystals encased in a surface sheath of silica. The fibers have diameters ranging about 100–500 A. (0.01–0.05 microns) and lengths up to 100 microns and even longer, in some instances, have been observed, thereby yielding a maximum length to diameter ratio of about 10,000:1. The very smallness of these fibers is of advantage in two respects: (1) discontinuities in the structure of the fibers, which frequently occur in large fibers, are generally absent so the total inherent strength of the crystalline structure is available; and (2) the fibers can be more easily dispersed in various matrices. These two characteristics recommend the fibers as reinforcing elements in plastics, rubbers, cements, and metals.

The fibers generally vary in color from white to a pale yellow with some deposits exhibiting a slight bluish cast. The surface sheath of silica, generally comprising about 50–75% of the total mass of the fiber, is advantageous in that is permits the fibers to be readily wetted and dispersed in both polar and non-polar liquids. Therefore, these fibers can be used for strengthening a broad spectrum of organic and inorganic products. Still another favorable factor lent to the fibers by the silica sheath is the development of a stronger bond between the fibers and the matrix material. It can be easily understood that a bond must be obtained between the fibers and the material to be reinforced in order to fully realize the strengthening effect of the fibers.

Defining the invention in more specific terms, the process consists of compounding a charge of powdered silicon carbide and at least one solid oxidant, both ingredients preferably being finer than 200 Tyler mesh and, ideally, finer than 10 microns, intimately mixing the two materials together, and then heating the charge in a substantial vacuum or in the presence of an inert gas at a temperature of about 1350°–1650° C. for a time sufficient to deposit the desired fibers. The formation of fibers begins essentially immediately after the required temperature and environmental conditions are attained. Thus, a continuous production of fibers could conceivably be undertaken wherein an amount of reaction charge could be introduced into the reaction zone which would balance the deposit of fibers removed as the reaction proceeded. However, in actual practice, a satisfactory deposit of fibers requires a reaction time of at least about one-half hour. The rate of oxidation of the SiC in the charge is dependent upon the firing temperature utilized and, since the rate of fiber growth is dependent upon the rate of oxidation of the SiC in the charge, there is obviously a time-temperature relationship involved in the rate at which fibers will be deposited. In general, then, longer reaction times are required at the lower end of the effective temperature range than at the upper. Hence, while a half hour may yield a good deposit of fibers at 1600° C., a period of time as long as 24 hours may be necessary to achieve good fibers yields at 1350° C. The maintenance of the reaction temperature for periods of time far in excess of that required to deposit a satisfactory yield of fibers does no essential harm to the fiber structure, but such long periods are deemed economically impractical. In commercial production, a reaction time of about 1–6 hours is employed with reaction temperatures ranging from about 1500°–1600° C.

Although the rate of fiber growth is more rapid at higher temperatures, the use of reaction temperatures above about 1650° C. produces fibers which are not as uniform in dimensions and they tend to become compacted together making their separation and subsequent dispersion in various matrices difficult. Where reaction temperatures less than about 1350° C. are employed, the rate of fiber growth is very slow and, therefore, the deposit thereof so small after a reasonable time for reaction that such temperatures are not considered economically practical.

The deposition of the fibers resulting from the reaction of SiO and CO occurs in the temperature range of about 1100°–1350° C.

As has been explained above, the generalized reaction occurring between the SiC and the solid oxidant is:

$$SiC + 2[O] \rightarrow SiO + Co$$

The rate at which this reaction takes place is a function of the amount of [O] which is available. The amount of [O] available per unit time is dependent in part upon the ease with which an [O] atom can be removed from the oxidant molecule. A measure of this ease of removal is provided by the free energy of dissociation of the oxide and suboxide. By using the known free energies of formation of the oxide and suboxide, the free energy change when oxygen is added to the suboxide can be calculated. Calculations of free energies of formation of many oxides are recorded in the published literature. The calculations listed below in Table I were taken from "Thermochemistry for Steelmaking" by Elliott and Gleiser, Addison-Wesley Publishing Company, Reading, Mass., 1960.

TABLE I $3Fe_2O_3 \rightarrow 2Fe_3O_4 = -3(93.3) + 2(139) = +4.1$ Kcal./mole
$Fe_2O_3 \rightarrow 2FeO = -93.3 + 2(37.1) = -19.1$ Kcal./mole
$Cr_2O_3 \rightarrow CrO = -166.4 + 2(68.0) = -30.4$ Kcal./mole
$SiO_2 \rightarrow SiO = -138 + 55.4 = -82.6$ Kcal./mole
$TiO_2 \rightarrow TiO = -153.0 + 25.1 = -127.8$ Kcal./mole
$Al_2O_3 \rightarrow 2AlO = -270.6 + 2(19.5) = -231.6$ Kcal./mole The equations as written give the free energies of formation in kilocalories/mole at 1700° K. of the various oxides from their suboxides. The free energy of dissociation is the reverse reaction and the sign of the free energy change will be reversed. Hence, from this table it can be seen that an oxygen atom is most easily removed from $Fe_2O_3$ (free energy of dissociation of $-4.1$ or $+19.1$ Kcal./mole) and most difficultly removed from $Al_2O_3$ (free energy of dissociation of $+231.6$ Kcal./mole).

From a study of the results obtained in the examples recorded in Table II, it was determined that an oxide suitable for this invention should have a free energy of dissociation of the oxygen atom less than about $+100$ Kcal./mole. Two other criteria which the oxide must meet are: (1) the oxide should not volatilize at the operating temperatures; and (2) the reduction product of the oxide must not inhibit fiber growth.

The drawings depict one apparatus which can be used for practicing the invention. This apparatus, contemplating a static system for the production of fibers, consists of a furnace composed of a refractory tube serving as the reaction chamber wound with wire in a manner such that a temperature gradient is set up along the length of the tube. This refractory tube is provided with a connection to a vacuum pump and, optionally, to a source of inert gas.

Thus, in the specific terms of the appended drawings, there is illustrated a gradient furnace, represented generally in side elevation in cross section at 1, consisting of an alumina, mullite, or sillimanite refractory tube 5 wound with platinum or platinum-rhodium alloy wire 4 surrounded with insulation 3, the complete unit being enclosed and retained within a steel casing 2. The windings of the wire 4 are spaced apart at predetermined distances such that a temperature gradient is provided within the refractory tube 5. An inner or working liner 6 consiging of a mullite or sillimanite refractory tube closed at the rear end is inserted to protect wire-wound tube 5 from mechanical damage and vapor corrosion during operation of the furnace and, thereby, preclude a furnace failure resulting from the reaction products contacting the wire. The working liner 6 projects a short distance in front of the furnace where it is connected to pipe 10 through a glass connection 9. Pipe 10 leads to a vacuum pump 12 through valve 11, or to a source of air (not shown) through valve 15, or to a source of inert gas such as lecture bottle 14 through valve 13. A rather close-fitting disc of platinum 7 is utilized as a radiation shield to reduce the loss of heat from the front of the working liner 6 but which allows a vacuum to be drawn within the furnace and, where desired, an atmosphere of inert gas to be introduced. An alumina refractory boat 8 holding a charge of finely-divided SiC and solid oxidant is placed within the working liner 6 in the area at which the predetermined desired temperature can be attained.

The charge of SiC and solid oxidant may vary from about 10:1 to 1:10 on a molar basis and a reasonable yield of fibers will result. However, the optimum molar ratio appears to be about 1 oxidant to 1 SiC. The most optimum yields of fibers, both with respect to fiber quality as well as quantity, have been produced where the starting materials have been very low in impurities. Nevertheless, quite acceptable fiber yields have been deposited where less pure ingredients have been employed.

In the examples recorded in Table II, a charge composed of about equimolar amounts of SiC and the solid oxidant carefully blended together, the particle size of these materials being about 10 microns, was placed in refractory boat 8. The weights of the charges were adjusted so the mixture contained 0.5 gram SiC in each instance. The loaded boat was then positioned within the working liner 6 at the proper place to obtain the predetermined desired reaction temperature. Radiation shield 7 was inserted into the front end of working liner 6 and pipe 10 connected through the glass connection 9. Valves 13 and 15 were closed and a vacuum of about 1 mm. of mercury was drawn and maintained through vacuum pump 12 as the furnace was heated to give a temperature of about 1200° C. in the area of boat 8. Thereafter, valve 11 was closed and, optionally, valve 13 opened to permit the entrance of an inert gas from lecture bottle 14 into the reaction chamber while the furnace was being rapidly heated to the desired reaction temperature. Valve 13, if previously opened, was then closed and the furnace maintained at the reaction temperature for the times recorded in Table II. The heat to the furnace was cut off and the furnace allowed to cool to about 400° C. at which time valve 15 was opened to complete the cooling and bring the reaction chamber to atmospheric pressure. The deposit of fibers was then removed from the reaction chamber and examined.

Table II records the effectiveness of several solid oxidants in oxidizing silicon carbide with the subsequent transport of the reaction products SiO and CO to a cooler area where precipitation of the desired fibers occurs. Examples 1–3 clearly reveal the need for an oxidant, the heating of the silicon carbide in the presence of a substantial vacuum or an inert gas resulting in no considerable deposit of fibers. Since the refractory tubes comprising the reaction chambers in this apparatus tend to deform and sometimes collapse when a high vacuum is drawn therein at temperatures exceeding about 1450° C., an inert gas is frequently introduced to produce a partial pressure within the tube to prevent such an occurrence. Nevertheless, the introduction of high partial pressures of these inert gases appears to exert a repressing effect upon the reaction generating SiO and CO so such should be done only at high reaction temperature. However, at reaction temperatures above about 1550° C., these inert gases may be added to one atmospheric pressure with consequent good fiber yields. Each description of fiber growth comprises an attempt to rank the yield by visual observation within an arbitrary series 1 to 10 wherein 10 designates the greatest fiber growth.

TABEL II

| Example No. | Oxidant utilized | Reaction temperature (° C.) | Partial pressure of added gas (mm.) | Time, hours | Description |
|---|---|---|---|---|---|
| 1 | | 1,450 | | 8 | 1 |
| 2 | | 1,500 | Helium, 200 mm | 4 | 1 |
| 3 | | 1,500 | Argon, 200 mm | 4 | 1 |
| 4 | Fe₂O₃ | 1,350 | | 12 | 3 |
| 5 | Fe₂O₃ | 1,400 | | 3 | 4 |
| 6 | Fe₂O₃ | 1,400 | | 6 | 5 |
| 7 | Fe₂O₃ | 1,400 | | 9 | 7 |
| 8 | Fe₂O₃ | 1,400 | | 12 | 9 |
| 9 | Fe₂O₃ | 1,430 | | 3 | 4 |
| 10 | Fe₂O₃ | 1,430 | | 6 | 9 |
| 11 | Fe₂O₃ | 1,500 | Helium, 200 mm | 2 | 5 |
| 12 | Fe₂O₃ | 1,500 | do | 4 | 8 |
| 13 | Fe₂O₃ | 1,600 | do | 1 | 5 |
| 14 | Fe₂O₃ | 1,600 | do | 2 | 9 |
| 15 | Fe₂O₃ | 1,650 | do | 0.5 | 6 |
| 16 | Fe₂O₃ | 1,650 | do | 1 | 10 |
| 17 | Cr₂O₃ | 1,375 | | 6 | 1 |
| 18 | Cr₂O₃ | 1,375 | | 12 | 3 |
| 19 | Cr₂O₃ | 1,430 | | 2 | 2 |
| 20 | Cr₂O₃ | 1,430 | | 4 | 5 |
| 21 | Cr₂O₃ | 1,430 | | 6 | 7 |
| 22 | Cr₂O₃ | 1,430 | | 8 | 9 |
| 23 | Cr₂O₃ | 1,500 | Argon, 200 mm | 1 | 2 |
| 24 | Cr₂O₃ | 1,500 | do | 3 | 5 |
| 25 | Cr₂O₃ | 1,500 | do | 5 | 8 |
| 26 | Cr₂O₃ | 1,550 | do | 1 | 3 |
| 27 | Cr₂O₃ | 1,550 | do | 3 | 8 |
| 28 | Cr₂O₃ | 1,600 | do | 0.5 | 2 |
| 29 | Cr₂O₃ | 1,600 | do | 1 | 4 |
| 30 | Cr₂O₃ | 1,600 | do | 2 | 8 |
| 31 | SiO₂ | 1,400 | | 2 | 4 |
| 32 | SiO₂ | 1,400 | | 4 | 6 |
| 33 | SiO₂ | 1,430 | | 1 | 2 |
| 34 | SiO₂ | 1,430 | | 3 | 6 |
| 35 | SiO₂ | 1,475 | Helium, 200 mm | 2 | 7 |
| 36 | SiO₂ | 1,550 | do | 1 | 6 |
| 37 | SiO₂ | 1,550 | do | 2 | 9 |
| 38 | SiO₂ | 1,650 | Helium, 760 mm | 0.5 | 7 |
| 39 | SiO₂ | 1,650 | do | 1 | 10 |
| 40 | TiO₂ | 1,430 | | 3 | 1 |
| 41 | TiO₂ | 1,430 | | 6 | 1 |
| 42 | TiO₂ | 1,430 | | 12 | 3 |
| 43 | TiO₂ | 1,500 | Argon, 200 mm | 2 | 1 |
| 44 | TiO₂ | 1,500 | do | 4 | 1 |
| 45 | TiO₂ | 1,500 | do | 8 | 3 |
| 46 | TiO₂ | 1,600 | Argon, 760 mm | 1 | 1 |
| 47 | TiO₂ | 1,600 | do | 4 | 4 |
| 48 | Al₂O₃ | 1,430 | | 3 | 1 |
| 49 | Al₂O₃ | 1,430 | | 6 | 1 |
| 50 | Al₂O₃ | 1,430 | | 12 | 1 |
| 51 | Al₂O₃ | 1,430 | | 24 | 2 |
| 52 | Al₂O₃ | 1,500 | Helium, 200 mm | 3 | 1 |
| 53 | Al₂O₃ | 1,500 | do | 6 | 1 |
| 54 | Al₂O₃ | 1,500 | do | 12 | 3 |
| 55 | Al₂O₃ | 1,600 | do | 1 | 1 |
| 56 | Al₂O₃ | 1,600 | do | 3 | 1 |
| 57 | Al₂O₃ | 1,600 | do | 6 | 3 |
| 58 | Fe₂O₃+Cr₂O₃ | 1,500 | do | 2 | 5 |

This table clearly manifests the action of solid oxidants having a free energy of dissociation of the oxygen atom less than about +100 Kcal./mole in oxidizing SiC such that substantial amounts of gaseous reaction products are developed which, when transported away from the reaction zone, will deposit a reasonable amount of fibers. Likewise, this table amply illustrates the interrelationship existing between the reaction times and temperatures employed in achieving fiber growth. Hence, the oxidation of SiC proceeds much more rapidly at the higher end of the effective temperature range than at the lower end thereof.

The practicality of employing solid oxidants having free energies of dissociation of the oxygen atom less than about +100 Kcal./mole is demonstrated by comparing the fiber yields set out in Table II with the free energies of dissociation determined from Table I. Hence, $Fe_2O_3$, $Cr_2O_3$, and $SiO_2$, having free energies of dissociation of −4.1 or +19.1, +30.4, and +82.6 Kcal./mole, respectively, oxidized SiC to such an extent that good fiber deposits resulted, whereas $TiO_2$ and $Al_2O_3$, having free energies of dissociation of +127.8 and +231.6, respectively, gave only meagre growths of fibers. Finally, the free energies of dissociation of BaO to the metal and $SnO_2$ to SnO of +94.5 Kcal./mole and +30.8 Kcal./mole, respectively, enable them to be utilized in place of $Fe_2O_3$, $Cr_2O_3$, and $SiO_2$. As would be expected, the fiber deposit generated by the use of BaO as the oxidant is less than where $SnO_2$ is employed.

The specific embodiments of the process of this invention have been disclosed in terms of a static system of operation. Nevertheless, it will be appreciated that the necessary combination of reactants, temperatures, and times of reaction can be attained through modifications in design of the apparatus. It will also be understood that variations in the design of the reaction apparatus, as illustrated in the drawings as static system, as well as in the detailed procedural steps of the process, may be undertaken without departing from the spirit of the invention so long as the specified interrelation of batch charges, temperatures, and times is observed. The selection of the process parameters and apparatus design can be readily determined by one skilled in the art within the framework of the basic description set forth above.

I claim:

1. A method for producing submicroscopic fibers containing silicon carbide crystals comprising the steps of
    (a) providing a charge consisting of finely-divided silicon carbide and at least one solid oxidant having a free energy of dissociation of the oxygen atom less than about +100 Kcal./mole in a reaction chamber, the ratio of silicon carbide to total solid oxidant varying from about 1:10 to 10:1 on the molar basis;
    (b) reacting said silicon carbide and said solid oxidant at a temperature between about 1350°–1650° C. in an atmosphere selected from the group consisting of a substantial vacuum and an inert gas for a period of time sufficient to attain the desired fiber formation, said solid oxidant being of such character that it does not volatilize at the reaction temperature and the reduction product thereof does not inhibit fiber growth; and, finally,
    (c) cooling the fibers to room temperature.

2. A method according to claim 1 wherein the reaction chamber containing the charge is evacuated to an absolute pressure of not more than about 5 mm. of mercury before the charge is exposed to 1350°–1650° C.

3. A method according to claim 1 wherein the period of time sufficient to attain the desired fiber formation ranges from about 0.5–24 hours.

4. A method according to claim 1 wherein the solid oxidant consists of at least one oxide selected from the group consisting of $Fe_2O_3$, $Cr_2O_3$, $SiO_2$, BaO, and $SnO_2$.

References Cited

UNITED STATES PATENTS

| | | |
|---|---|---|
| 3,161,473 | 12/1964 | Pultz. |
| 3,175,884 | 3/1965 | Kuhn. |
| 3,246,950 | 4/1966 | Gruber. |
| 3,271,109 | 9/1966 | Mezey et al. |
| 3,335,049 | 8/1967 | Pultz _____ 117—106 X |

ALFRED L. LEAVITT, *Primary Examiner.*

A. GOLIAN, *Assistant Examiner.*

U.S. Cl. X.R.

23—208; 106—44; 117—119; 161—176